FACSIMILE SYNCHRONIZING SYSTEM

Filed Oct. 30, 1948 2 Sheets-Sheet 1

INVENTOR
Charles J. Young
BY
ATTORNEY

Jan. 16, 1951 C. J. YOUNG 2,538,547

FACSIMILE SYNCHRONIZING SYSTEM

Filed Oct. 30, 1948 2 Sheets-Sheet 2

INVENTOR
Charles J. Young
BY
[signature]
ATTORNEY

UNITED STATES PATENT OFFICE 2,538,547

FACSIMILE SYNCHRONIZING SYSTEM

Charles J. Young, Princeton, N. J., assignor to Radio Corporation of America, a corporation of Delaware Application October 30, 1948, Serial No. 57,605

6 Claims. (Cl. 178—69.5)

The present invention relates to facsimile systems and apparatus and more particularly, but not necessarily exclusively, to a novel facsimile system for transmitting and recording pictures, messages, and other subjects in facsimile.

The primary object of the present invention is to provide a novel system including a transmitting station and a recording station or stations so arranged that messages may be transmitted and received with a minimum of supervision and attention.

Another object of the invention is to provide a novel facsimile system comprising a transmitting scanner and a recording scanner, or scanners, in which a phasing signal is originated at the recorder to initiate operation of the transmitting scanner when its exploring point is in a desired position with respect to a message sheet.

Another object of the invention is to provide a facsimile system in which the facsimile transmission and control circuits are operated in a novel manner by alternating currents thus providing for operation over carrier telegraph channels or over radio links.

Other objects and advantages of the present invention will, of course, become apparent and immediately suggest themselves to those skilled in the art to which the invention is directed from a reading of the following specification in connection with the accompanying drawings in which.

Figures 1, 2:
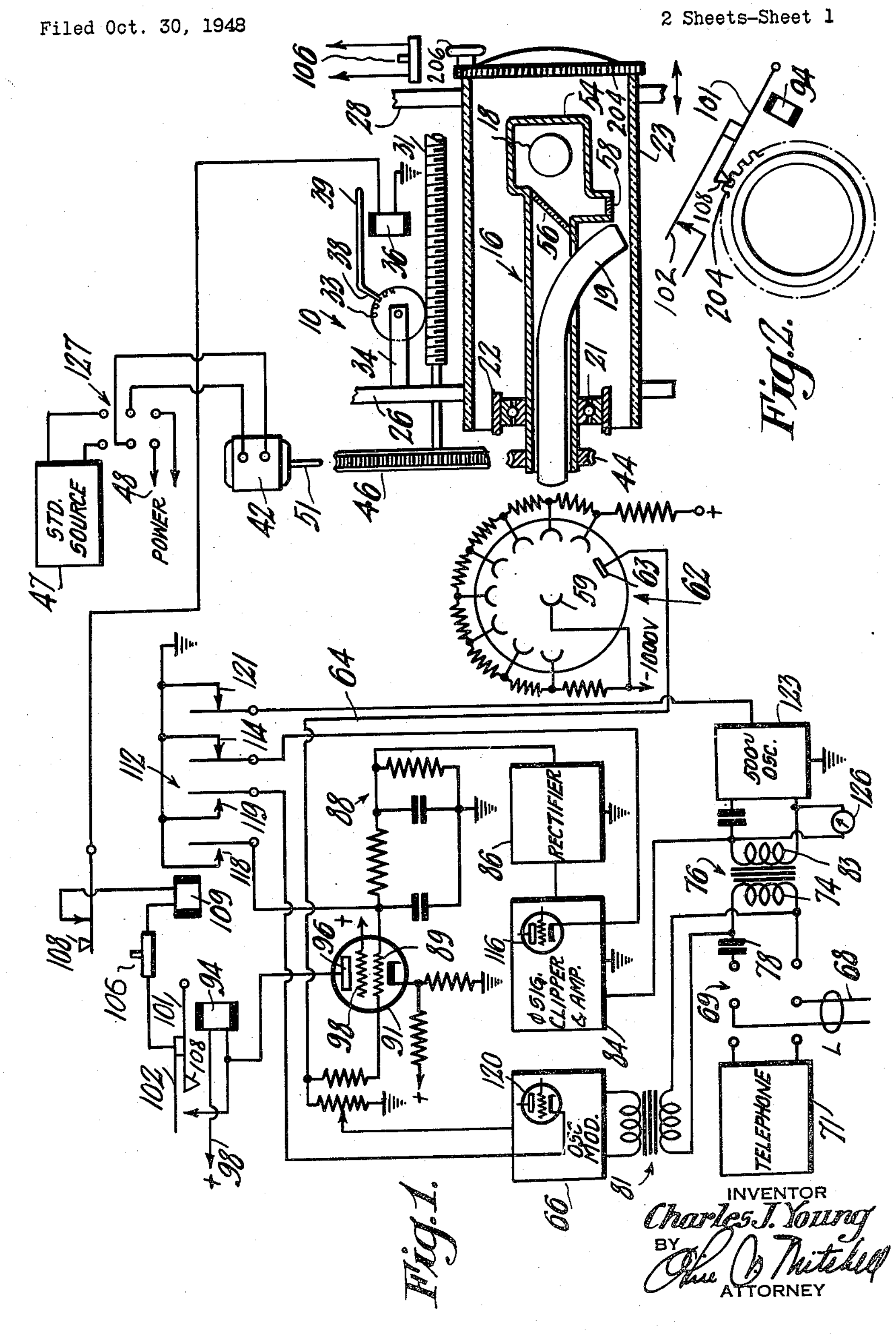
Fig. 1 is a schematic showing of a transmitting station embodying features of the present invention.
Fig. 2 is a fragmentary showing of a detail of the transmitter scanner disclosed illustratively in Fig. 1.

In accordance with the invention, the transmitting station originates and delivers image signals derived as a result of scanning messages, images and other subject matter for transmission to a more or less remote recorder. More than one recorder may be serviced from a single transmitter if a suitable switchboard arrangement (not shown) is provided. By way of example, and for the sake of illustration of the invention, a transmitting scanner, indicated at its entirety by reference character 10 is shown which may be similar to that disclosed and claimed in copending application Serial No. 57,606, filed Oct. 30, 1948, entitled Facsimile Scanner. Only the features of the transmitter scanner which are necessary to the understanding of the operation of the system of the present invention are illustrated herein for the sake of completeness of disclosure. A receiving station embodying features of the invention is disclosed in Fig. 3 and the recorder 14, which is shown diagramatically for illustrative purposes, may include features of the recorder of this inventor which is disclosed and claimed in a copending application Serial No. 57,604 filed Oct. 30, 1948, entitled Facsimile Scanner.

The transmitting station of Fig. 1 will now be described. The scanner 10 comprises a rotatable scanning mechanism 16 which includes a source of illumination such as a lamp 18 and a light transmitting member 19. The rotary member 16 is supported for rotation by suitable means such as a ball bearing 21 or a plurality of such bearings (not shown) carried by a suitable stationary portion 22 of the apparatus. A transparent cylinder 23 receives the subject copy thereon and a convenient means of loading this copy comprises a flexible curtain (not shown) as disclosed in copending application Serial No. 57,606 referred to above. In order that a message sheet may be loaded onto the cylinder 23, it is supported for rotation in end frame members 26 and 28 which are or may be parts of a carriage which is movable axially of the mechanism 16 to provide a scanning coordinate of a scanning pattern. In the assumed example, a message sheet will be scanned in closely spaced helical lines when it is in scanning position on the cylinder 23. The carriage, which carries the cylinder 23, is propelled by means of a lead screw 31 which is engaged by a worm wheel 33 rotatably supported by a bearing bracket 34 from the carriage frame member 26. In order that the worm wheel 33 may serve to propel the carriage, a magnet 36 having a pawl 38 at the end of its armature 39 is provided so that the worm 33 is locked against rotation when the magnet 36 is energized. By this arrangement, the worm wheel 33 serves as a readily controllable half nut. A motor 42 is provided which drives the rotary member 16 and the lead screw 31 by means of worm wheels 44 and 46 respectively. This is accomplished in the illustrative arrangement by extending the armature shaft 51 of the motor so that worms (not shown) thereon will mesh with the worm wheels 44 and 46. These wheels and the pitch of the screw 31 are so proportioned that scanning of the subject copy is obtained when the motor rotates.

The motor 42 may be a synchronous motor operated from a suitable standard frequency source 47. Also, the motor 42 may be operated from an alternating current power system, as indicated schematically at 48, which also operates the recorder 14 at a recording station. It will be understood that if the motor 42 is to be operated from a standard frequency source, then it will be desirable to operate the power drive means of the recorder 14 from a source having as nearly as possible the same frequency characteristics.

Light from the lamp 18, which is carried in a suitable housing 54 forming a part of the rotary mechanism 16, is directed by a mirror 56 and a lens 58 onto the surface of a message sheet on the outer periphery of the drum 23 in the form of a scanning spot. The light transmitting member 19 transmits light picked up from this scanning spot onto the cathode 59 of a phototube 62. This phototube is preferably of the electron multiplier type such as the type 931A. The output from the phototube is taken from an electrode 63 and is applied by way of a conductor 64 to an amplifier 66.

The station transmitting circuit, which is shown illustratively as a pair of lines 68, is connected to a suitable switch 69, shown illustratively as a double-throw switch, so that a telephone instrument 71 may be connected in circuit when desired. The switch 69 serves when desired to connect the lines 68 to the secondary 74 of a transformer 76. A blocking condenser 78 is or may be included when desired. The output from the previously mentioned amplifier 66 is coupled to the switch terminals of the switch 69 by way of a suitable transformer 81.

As stated briefly in the foregoing, the transmitting scanner 10 operates in response to a phasing signal received from a more or less remote recorder. In order that this may be accomplished, the primary 83 of the transformer 76 is connected to a phasing signal clipper and amplifier 84. The output of this amplifier is rectified by rectifier 86 and is applied through a suitable filter network 88 to the grid 89 of an electron discharge tube 91. The grid 89 of this discharge tube is also connected to the conductor 64 so that signals derived from the phototube 61 will serve, when they are generated, to bias off the tube 91 except when a suitable non-reflecting phasing mark is operatively in alignment with the lens 58 and the scanning beam issued therefrom. When the scanning beam is directed on such a non-reflecting spot and when a pulse is simultaneously received, rectified and applied to the grid 89 of the tube 91, this tube will become conductive. The operating coil 94 of a phasing magnet is included in the anode circuit of the tube 91, this circuit being traceable from the tube anode 96, through the magnet coil to a suitable source of positive potential indicated diagrammatically at 98. The armature 101 of the phasing magnet carries a contact arm 102 which is adapted to make contact with a stationary contact 103 connected to source 98 through the winding 94. The contacts 102 and 103 are included in a controlling circuit comprising a stop-switch 106, a hand switch or key 108, the operating coil 109 of a signal relay 112, and the magnet coil 36 of the half nut operating magnet.

The signal relay 112 is provided with a tongue and break contact 114 which is opened when the coil 109 is energized. The relay tongue associated with the break contact 114 is connected, for example, in the cathode circuit of a tube 116, shown diagrammatically, in the signals clipper and amplifier 84 so that when the relay 112 is energiz d this amplifier 84 will be disabled. The relay 112 also includes a tongue and make contact 118 which are closed when the relay coil 109 is energized. The relay tongue associated with the make contact 118 is connected to the grid 89 of the tube 91 so that upon energization of the relay 112 the phototube circuit will have better characteristics for providing image signals. A tongue and make contact 119 is connected to cause operation of the oscillator modulator 66. As shown schematically, the relay tongue may be connected to the cathode of a tube 120. A break contact 121 allows a signal oscillator 123 to function when the relay 112 is energized.

When the carriage which supports the stationary cylinder 23 is at the effective end of its travels, the switch 106 is opened by any suitable abutting portion of the carriage which interrupts the flow or current through the relay coil 109 to stop the scanner 10. Operation of the scanner may be interreupted at any time by manipulating the switch 108 which also opens the circuit of the relay coil.

A frequency meter 126 enables an operator to determine the frequency of the incoming tone from the recorder which may be used as a guide for the manipulation of a switch 127 for selecting the power source 47 or 48 or for oth r purposes, if desired.

Figure 3:
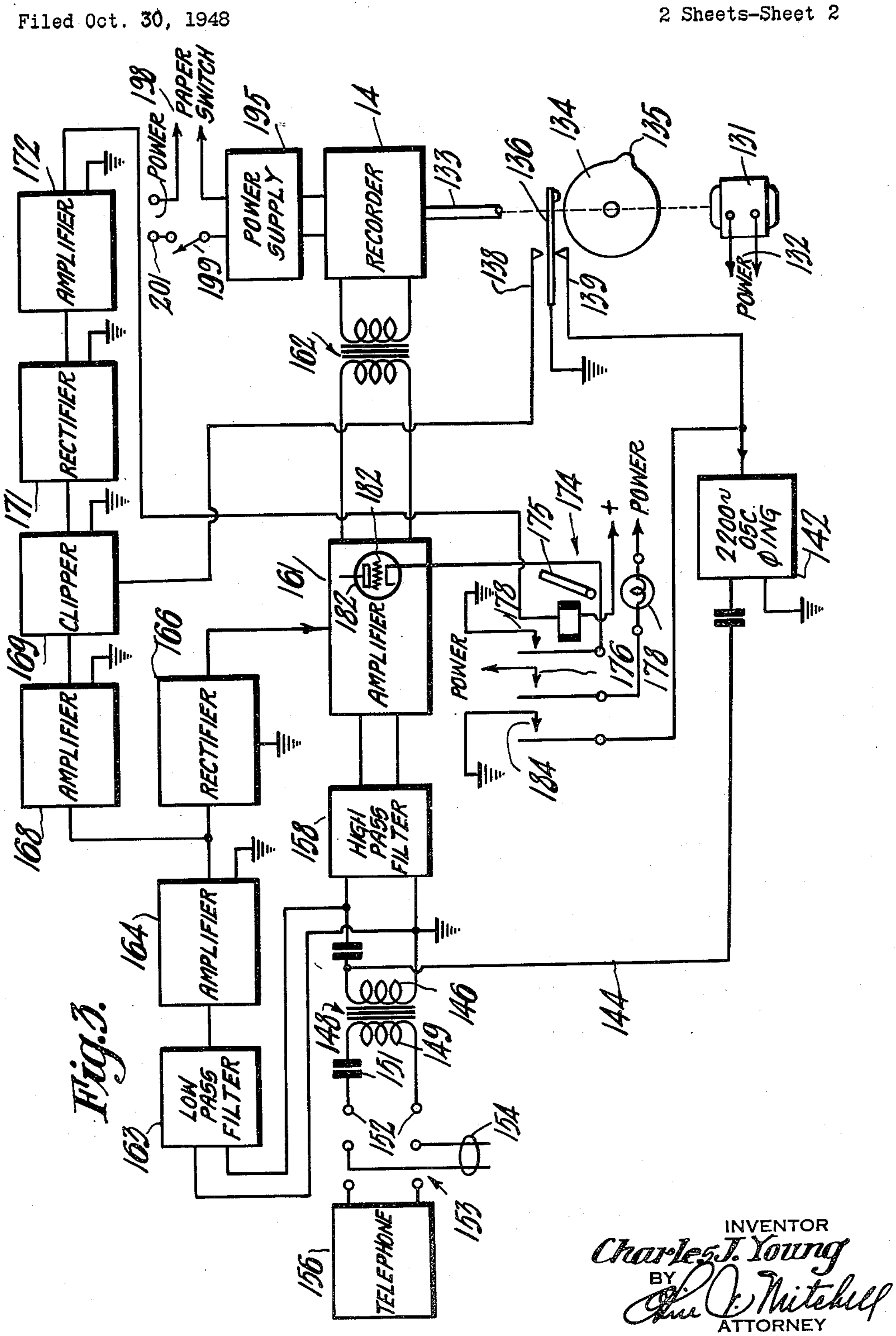
Fig. 3 is a schematic showing of a recording station embodying the invention and adapted to operate in conjunction with the station of Fig. 1.

Fig. 3 of the drawings schematically discloses a receiving station which operates with the transmitter station of Fig. 1 in accordance with the invention. The previously mentioned recorder may be of any suitable type, but it is preferably of the kind disclosed and claimed in the above mentioned application Serial No. 57,604.

It will be understood that this receiver will include means (not shown) for recording on a suitable recording blank which means may comprise a copy holder for holding a recording blank which is to be traversed by a recorder stylus. The recorder is driven by a suitable motor 131 which may be supplied from terminals 132 with power from a commercial power source at regulated frequency. At certain receiv r locations such a power source may not be available, in which case a standard frequency source not shown may be employed which supplies power of a frequency identical with that obtainable at the transmitting station from a source 47 as indicated in the foregoing. If the latt r is to be used, the oscillator 142, to be described, may have a characteristic frequency. Recording drive shaft 133 has a cam 134 mounted thereon which is provided with a cam projection 135. This cam projection operates a phasing switch for producing phasing impulses preferably at a time when a portion of the recording blank at or adjacent its end is passing under the recording means such for example, as a recording stylus, not shown. This phasing switch includes a switch tongue 136, a normally open contact 138, and a normally closed contact 139. The normally closed contact 139 controls operation of the oscillator 142, the function of which is to provide phasing signals for operating the phasing magnet 94 at the transmitting station. Generation of phasing signals may be accomplished by removing ground from the grid circuit of the oscillator as indicated diagrammatically when the cam projection 135 moves the contact arm 136. The output from the oscillator is applied by way of a conductor 144 to one terminal of the secondary 146 of a transformer 148. The primary 149 of this transformer is connected by way of a coupling condenser 151 to the terminals 152 of a suitable double-throw switch or key 153. This key provides a means for connecting the communication channel, such as the lines 154 into a telephone instrument 156 when facsimile communication is not desired. The secondary 146 of the transformer 148 is connected by way of a high-pass filter 158, an amplifier 161, and a coupling transformer 162 to the recorder 14.

A low-pass filter 163 selects a low frequency signal, for example, from a transmitting station, with which the recording station is in communication, so that it may be applied after amplification in an amplifier 164, to a rectifier 166. The output of the rectifier is applied as indicated schematically to the amplifier 161 to control its gain thereby to provide an automatic gain control for the recorder 14. The output of the rectifier is negative signal so that as the strength of the received signal increases the gain of the amplifier 161 will be decreased. The output of the low-pass filter 163 is further amplified in an amplifier 168, is clipped in a clipper stage 169 and is rectified by rectifier 171. This rectified output is further amplified by the amplifier 172 and provides energy for operation of a control magnet and relay 174. This relay is provided with an armature, indicated schematically at 175, for operating the half nut of the recorder mechanism and also for bringing the recording instrumentality into contact with the surface of the recording medium. The relay 174 is provided with tongue and make contact 176 which controls illumination of a pilot lamp 178 which is or may be connected across a suitable power supply source such as the supply source for the motor 131. A tongue and make contact 178 serves to control the amplifier 161 by closing the cathode circuit of one of its tubes shown diagrammatically at 182 so that this amplifier becomes operative to provide recording signals for operation of this record 14. A tongue and make contact 184 maintains the oscillator 142 in an inoperative condition. It will be noted that the tongue and make contact 184 functions in the same manner as the contact arm 136 and the contact 139 of the cam switch which is operated by the cam 134.

The normally open contact 138 serves to short circuit the clipper 169. The purpose of this connection is to render the control circuit for the relay 174 inoperative when the oscillator 142 is to send a signal thus preventing a relay 174 from being operated at this time.

The direct current power supply 195 for the electronic equipment of the receiving station is connected to power service terminals 201. This may be the power service supply for the motor 42. A switch 198 (not shown in detail herein) is arranged to be maintained open unless the recorder 14 is supplied with a suitable recording medium, such as a recording blank. A manually operable switch 199 controls the power supply and it may be interlocked with the mechanism of the recorder, for example, as disclosed in application Serial No. 57,604 referred to above.

It will be seen from the foregoing that a facsimile communication system is provided in which transmitter is phased from the recorder in a novel manner. Phasing of the transmitter starts transmission of the image signal and sends a control tone to the recorder which controls the recording channel gain and starts the recorder by operating the magnet 174. Paper must be supplied to the recorder before it can become operative to initiate the timed phasing signal. A message sheet on the cylinder 23 may have a non-reflective mark therein and when the light spot passes over this mark, bias is reduced on the tube 91. The cylinder 23 may be turned angularly by a crank 206, or other suitable means and when a phasing signal, received from the recorder, coincides in time with the transmitter signal produced by the mark on the message sheet, the magnet 94 is energized. A pawl 108 on its armature 101 engages teeth 204 to lock the cylinder 23 in angular position following phasing.

What is claimed is:

1. In a communication system, a transmitting station and a receiving station, a communication channel interconnecting said stations, transmitting equipment at said transmitting station, means responsive to a signal generated by said equipment to delay operation of said equipment, receiving equipment at said receiving station, means responsive to the operative condition of said receiving equipment for initiating transmitter equipment control signals, and means at said transmitting station to apply the signal from the receiving equipment in coincidental relationship with the signal generated by said transmitter to cause operation of said transmitter equipment.

2. In a communication system, a transmitting station and a receiving station, a communication channel interconnecting said stations, transmitting equipment at said transmitting station, for generating signals for transmission to the receiving station, means for coupling said signal generating means to said transmission channel, means responsive to a signal generated by said equipment to hold said coupling means ineffective, said coupling means being conditioned for effectiveness upon occurrence of an interruption in said signal, receiving equipment at said receiving station, means responsive to the operative condition of said receiving equipment for initiating control signals for transmission over said channel to said transmitting station, means at said transmitting station to apply the signal from the receiving equipment to said coupling means, said coupling means becoming effective when said interruption and said received signal coincide in time of application.

3. In a facsimile communication system, a transmitting station and a receiving station, a communication channel interconnecting said stations, transmitting equipment at said transmitting station, drive means for said transmitting equipment, a power source for said drive means for providing alternating current electrical energy at a controlled frequency, a commercial power source, means selectively to connect said drive means to either power source, receiving equipment at said receiving station, drive means for said receiving equipment, an available power source, means at said receiving station coupled to said communication channel to originate a signal indicative of a characteristic of the power source at the receiver, and means at said transmitting station responsive to the transmitted signal for indicating the desired operation of said selectively connecting means.

4. In a communication system, a transmitting station and a receiving station, a communication channel interconnecting said stations, transmitting equipment at said transmitting station, means responsive to a signal generated by said equipment to delay operation of said equipment, receiving equipment at said receiving station, means responsive to the operative condition of said receiving equipment for initiating transmitter equipment control signals, means at said receiver for initiating signal receiving operation of said receiver in response to a signal from said transmitter, means at said transmitting station to apply the signal from the receiving equipment in coincidental relationship with the signal generated by said transmitter to cause operation of said transmitter equipment and means at said transmitter responsive to operation thereof to provide a control signal for initiating signal receiving operation of said receiver.

5. A facsimile communication system comprising a transmitting station and a receiving station, a communication channel interconnecting said stations, a facsimile transmitting scanner for generating image signals at said transmitting station, means to delay operation of said transmitting scanner, means responsive to an interruption in the generation of said image signals to maintain said operation delaying means in condition to delay operation of said facsimile scanner, a facsimile recorder at said receiving station, means responsive to the image signal receiving condition of said recorder for generating periodic control signals, means at said transmitting scanner to apply the periodic control signals received from said receiving station to said means for delaying operation of said scanning equipment, said means for producing delay in operation being responsive to coincidental interruption in the application of said image signal generated by said facsimile scanner and the application of said received signal for initiating operation of said transmitting scanner.

6. A facsimile communication system comprising a transmitting station and a receiving station, a communication channel interconnecting said stations, a facsimile transmitting scanner for generating image signals at said transmitting station, means to delay operation of said transmitting scanner, a discharge tube having at least a control electrode, a cathode and an anode, said control electrode being coupled to said scanner whereby said tube is maintained cutoff during generation of image signals and is responsive to other signals during an interruption in the generation of said image signals, a facsimile recorder at each receiving station, means responsive to the image signal receiving condition of said recorder for generating periodic control signals, means at said transmitting scanner to apply the periodic control signals received from said receiving station to the control electrode of said tube, said means for producing delay in operation being responsive to coincidental application of said signal generated by said facsimile scanner and said received signal for initiating operation of said transmitting scanner to said control electrode.

CHARLES J. YOUNG.

REFERENCES CITED

The following references are of record in the file of this patent:

UNITED STATES PATENTS

| Number | Name | Date |
|---|---|---|
| 2,255,868 | Wise | Sept. 16, 1941 |
| 2,290,231 | Finch | July 21, 1942 |